United States Patent
Li

(10) Patent No.: US 10,334,448 B2
(45) Date of Patent: Jun. 25, 2019

(54) TRANSMISSION PARAMETER DETERMINING METHOD, TRANSMISSION CONTROL METHOD, AND APPARATUSES THEREFOR

(71) Applicant: Beijing Zhigu Tech Co., Ltd., Beijing (CN)

(72) Inventor: Yong Li, Beijing (CN)

(73) Assignee: BEIJING ZHIGU TECH CO., LTD., Beijing (CN)

(*) Notice: Subject to any disclaimer, the term of this patent is extended or adjusted under 35 U.S.C. 154(b) by 92 days.

(21) Appl. No.: 15/284,630

(22) Filed: Oct. 4, 2016

(65) Prior Publication Data

US 2017/0150514 A1    May 25, 2017

(30) Foreign Application Priority Data

Nov. 24, 2015    (CN) .......................... 2015 1 0823466

(51) Int. Cl.
     *H04W 72/12*      (2009.01)
     *H04W 16/14*      (2009.01)
     *H04W 72/02*      (2009.01)

(52) U.S. Cl.
     CPC ............ *H04W 16/14* (2013.01); *H04W 72/02* (2013.01); *H04W 72/1289* (2013.01)

(58) Field of Classification Search
     CPC ............. H04W 72/12; H04W 72/1215; H04W 72/0453; H04W 16/14
     See application file for complete search history.

(56) References Cited

U.S. PATENT DOCUMENTS

| | | | |
|---|---|---|---|
| 2016/0227578 A1* | 8/2016 | Lee ...................... | H04W 74/004 |
| 2017/0111913 A1* | 4/2017 | Li ....................... | H04W 72/0453 |
| 2018/0027493 A1* | 1/2018 | Li ....................... | H04W 52/0216 |
| 2018/0249507 A1* | 8/2018 | Kudo ..................... | H04W 2/04 |

* cited by examiner

*Primary Examiner* — Wei Zhao
(74) *Attorney, Agent, or Firm* — Sheppard Mullin Richter & Hampton LLP

(57) ABSTRACT

Embodiments of the present application disclose a transmission parameter determining method, a transmission control method, and apparatuses therefor. The transmission parameter determining method comprises: obtaining transmission parameter information associated with at least two carriers allocated for a user equipment, wherein the at least two carriers comprise a carrier resource in an unlicensed spectrum, and the transmission parameter information is used to indicate at least one first transmission parameter separately associated with at least two possible use statuses of the at least two carriers; determining an available carrier of the user equipment in the at least two carriers; and determining at least one second transmission parameter, associated with the determined available carrier, of the user equipment at least according to the transmission parameter information. The methods and apparatus of the embodiments of the present application can prevent some transmission resources from being wasted.

33 Claims, 4 Drawing Sheets

TRANSMISSION PARAMETER DETERMINING METHOD, TRANSMISSION CONTROL METHOD, AND APPARATUSES THEREFOR

TECHNICAL FIELD

The present application relates to the field of communications technologies, and in particular, to a transmission parameter determining method, a transmission control method, and apparatuses therefor.

BACKGROUND

A licensed spectrum is a wireless spectrum granted to an operator to use according to laws and regulations of each country, and only a wireless spectrum that has a license and authorization and that passes a network entry tested and is licensed can be used. However, an unlicensed spectrum, for example, a working frequency band of a device such as a WiFi device or a Bluetooth device, can be used without being authorized by a government. Because licensed spectrum resources allocated for mobile communications are exiguous, which limits a future development scale of a mobile communications network, currently, combining licensed spectrums with a great number of unlicensed spectrums is taken into consideration, so as to improve a transmission capacity of a mobile network. According to statistics, currently, in the 5 GHz frequency band, a sum of unlicensed spectrum resources that has been allocated in all the countries around the world may exceed 500 MHz, and mobile communication device manufacturers and mobile network operators pay attention to these unlicensed WiFi spectrums, so as to derive solutions such as the LTE in unlicensed spectrum (LTE-U), and currently, announce that testing projects on the LTE-U would be carried out. A License Assisted Access (LAA) technology that is currently actively researched by the International Organization for Standardization 3GPP is a typical solution of expanding a capacity of a mobile communication system by using unlicensed spectrums, in which a transmission capacity of an LTE system is further improved by allowing the LTE system to use unlicensed spectrums.

In an LAA system, a base station may improve user throughput and a system capacity by using unlicensed spectrums. However, because the unlicensed spectrums are shared among multiple systems, to enable the systems to have fair opportunities to access the unlicensed spectrums, a conventional contention mechanism is generally used to determine use of the unlicensed spectrums. Uplink scheduling of the LAA system is used as an example, and a relatively mainstream implementation method that is currently proposed is: the base station first schedules some user equipments (UEs) at a scheduling moment and determines information such as time frequency resources occupied by users and transmission parameters (for example, transmit power, a modulation and coding scheme, and a data block size) in a scheduling instruction (UL Grant), so as to instruct the user equipments to prepare for uplink transmission. However, because fair access to a spectrum needs to be implemented with another coexistent wireless system (for example, an 802.11 wireless local area network system) in the unlicensed spectrum, a competitive channel access mechanism is used. Therefore, at a scheduling moment when the base station schedules uplink transmission of a user in the unlicensed spectrum, it is impossible to determine whether the user equipment can successfully obtain the channel by contention at an expected uplink transmission moment after several sub-frames (for example, for an LTE Frequency Division Duplexing (FDD) system, the fourth sub-frame following the current sub-frame). When the base station schedules uplink transmission of a specific user on multiple unlicensed carriers at the same time, the user equipment may possibly not obtain a channel on some carriers by contention to cause that transmission cannot be carried out. In addition, because some transmission parameters on each carrier have been specified by the base station in advance, waste of some transmission resources (for example, transmit power) of the user equipment may be caused, thereby reducing flexibility and transmission efficiency of the LAA system.

SUMMARY

In view of this, an objective of embodiments of the present application is to provide a transmission parameter determining solution capable of effectively using a transmission resource of a user equipment and improving flexibility and transmission efficiency of an LAA system.

In order to achieve the foregoing objective, in a first aspect of the embodiments of the present application, a transmission parameter determining method is provided, and the method comprises:

obtaining transmission parameter information associated with at least two carriers allocated for a user equipment, wherein the at least two carriers comprise a carrier resource in an unlicensed spectrum, and the transmission parameter information is used to indicate at least one first transmission parameter separately associated with at least two possible use statuses of the at least two carriers;

determining an available carrier of the user equipment in the at least two carriers; and determining at least one second transmission parameter, associated with the determined available carrier, of the user equipment at least according to the transmission parameter information.

In a second aspect of the embodiments of the present application, a transmission control apparatus is provided, and the method comprises:

determining at least one first transmission parameter associated with at least two possible use statuses of at least two carriers allocated for a user equipment, wherein the at least two carriers comprise a carrier resource in an unlicensed spectrum; and sending transmission parameter information associated with the at least one first transmission parameter.

In a third aspect of the present application, a transmission parameter determining apparatus is provided, and the apparatus comprises:

a first obtaining module, configured to obtain transmission parameter information associated with at least two carriers allocated for a user equipment, wherein the at least two carriers comprise a carrier resource in an unlicensed spectrum, and the transmission parameter information is used to indicate at least one first transmission parameter separately associated with at least two possible use statuses of the at least two carriers;

a first determining module, configured to determine an available carrier of the user equipment in the at least two carriers; and a second determining module, configured to determine at least one second transmission parameter, associated with the determined available carrier, of the user equipment at least according to the transmission parameter information.

In a fourth aspect of the present application, a transmission control apparatus is provided, and the apparatus comprises:

a third determining module, configured to determine at least one first transmission parameter associated with at least two possible use statuses of at least two carriers allocated for a user equipment, wherein the at least two carriers comprise a carrier resource in an unlicensed spectrum; and a second sending module, configured to send transmission parameter information associated with the at least one first transmission parameter.

In a fifth aspect of the present application, a transmission apparatus is provided, and the apparatus comprises:

a transceiver;

a memory, configured to store an instruction; and a processor, configured to execute the instruction stored by the memory, wherein the instruction enables the processor to perform the following steps:

obtaining transmission parameter information associated with at least two carriers allocated for a user equipment, wherein the at least two carriers comprise a carrier resource in an unlicensed spectrum, and the transmission parameter information is used to indicate at least one first transmission parameter separately associated with at least two possible use statuses of the at least two carriers;

determining an available carrier of the user equipment in the at least two carriers; and determining at least one second transmission parameter, associated with the determined available carrier, of the user equipment at least according to the transmission parameter information; and performing uplink transmission at least according to the at least one second transmission parameter by using the transceiver.

In a sixth aspect of the present application, a transmission control apparatus is provided, and the apparatus comprises:

a transceiver;

a memory, configured to store an instruction; and a processor, configured to execute the instruction stored by the memory, wherein the instruction enables the processor to perform the following steps:

obtaining a scheduling instruction by using the transceiver, wherein the scheduling instruction is used to instruct a user equipment to perform transmission preparation;

determining at least one first transmission parameter associated with at least two possible use statuses of at least two carriers allocated for a user equipment, wherein the at least two carriers comprise a carrier resource in an unlicensed spectrum; and sending transmission parameter information associated with the at least one first transmission parameter by using the transceiver.

In the methods and apparatuses of the embodiments of the present application, a user equipment is granted with specific independence in terms of uplink transmission parameter selection by providing a feasible uplink transmission parameter set for the user equipment, and an actual uplink transmission parameter may be determined according to factors, such as an actual available carrier resource, of the user equipment, so as to prevent some transmission resources from being wasted.

DETAILED DESCRIPTION

Specific implementations of the present invention are further described in detail below with reference to the accompanying drawings and embodiments. The following embodiments are intended to describe the present invention, but not to limit the scope of the present invention.

It should be understood that the terms "first", "second", and the like are merely used to distinguish different devices, modules, parameters, and the like, and neither represent any special technical meaning, nor represent a necessary logical sequence therebetween.

Figure 1:
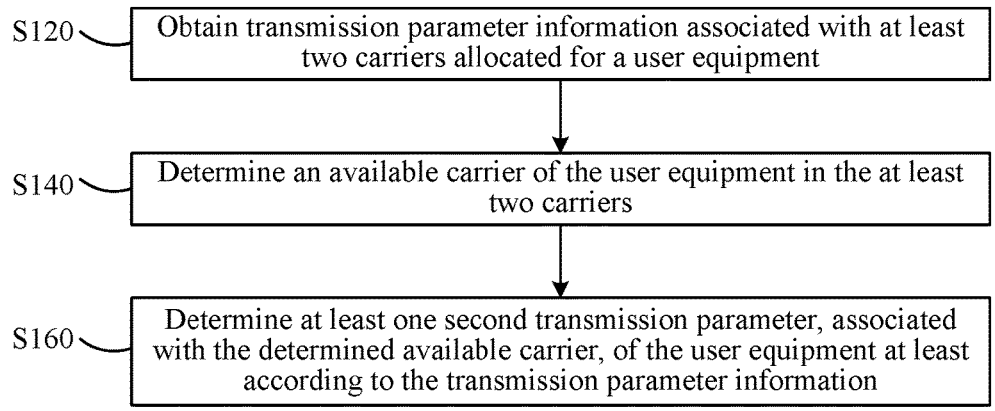
FIG. 1 is an illustrative flowchart of a transmission parameter determining method according to an embodiment of the present application.

FIG. 1 is an illustrative flowchart of a transmission parameter determining method according to an embodiment of the present application. This method is particularly applicable to a scenario where a base station schedules a user equipment on two or more than two carriers at the same time to perform uplink transmission and determines a transmission parameter actually used by the user equipment when the user equipment performs uplink transmission at a transmission moment. This method may be executed by any user equipment (UE). As shown in FIG. 1, the method comprises:

S120: Obtain transmission parameter information associated with at least two carriers allocated for a user equipment, wherein the at least two carriers comprise a carrier resource in an unlicensed spectrum, and the transmission parameter information is used to indicate at least one first transmission parameter separately associated with at least two possible use statuses of the at least two carriers.

In the method of this embodiment, a base station schedules uplink transmission of a user equipment on two or more than two carriers at the same time, and the two or more than two carriers may merely comprise a carrier resource in an unlicensed spectrum or may not only comprise a carrier resource in a licensed spectrum, but also comprise a carrier resource in an unlicensed spectrum. At least one of at least two possible use statuses of the at least two carriers comprises: using at least two carriers in the at least two carriers at the same time. For example, a base station schedules a user equipment on carriers 1, 2 in an unlicensed spectrum and a carrier 3 in a licensed spectrum at the same time to perform uplink transmission, because of uncertainty of a carrier resource that belongs to the unlicensed spectrum in actual use, at a transmission moment, actual statuses of using the three carriers by the user equipment may comprise: a) all the carries 1, 2, 3 can be used at the same time, b) the carriers 1 and 2 can be used at the same time, c) the carriers 2, 3 can be used at the same time, d) the carriers 1, 3 can be used at the same time, and e) only one carrier, namely, the carrier 1 or 2 or 3 can be used. According to the method of this embodiment, at least one of at least two possible use statuses of the at least two carriers indicated by the transmission parameter information comprises any one of the foregoing a), b), c) and d) in actual use. In other words, the transmission parameter information in the method of this embodiment is used to indicate: with regard to the at least two carriers allocated by the base station, a feasible set of at least one first transmission parameter in at least two possible use statuses comprising using multiple carriers at the same time.

In the method of this embodiment, in the transmission parameter information, a first transmission parameter can be definitely specified, or an index of a first transmission parameter may be comprised, or various possible first transmission parameters may be represented in a manner of using a basic transmission parameter and an increment. For example, at least one first transmission parameter comprises a basic modulation and coding scheme, and an offset on the basis of the modulation and coding scheme is used to incrementally represent another feasible modulation and coding scheme. The transmission parameter information may also be any other information used to indicate the at least one first transmission parameter. In addition, the at least one first transmission parameter may comprise but not limited to one or more of the following: a modulation and coding scheme, uplink power of the user equipment, a size of a physical resource block used by the user equipment for sending uplink service data, or any other parameter to be used in uplink transmission. At least one first transmission parameter corresponding to each carrier resource may be determined by a base station side according to a channel status, rated transmit power of the user equipment, a distance between the user equipment and the base station, possible interference, and the like and notified to the user equipment at a scheduling moment. In step S120, the at least one transmission parameter may be obtained in a manner of communicating with the base station or the user equipment.

S140: Determine an available carrier of the user equipment in the at least two carriers.

In a possible implementation manner, the available carrier may be determined by the user equipment in a contention manner.

S160: Determine at least one second transmission parameter, associated with the determined available carrier, of the user equipment at least according to the transmission parameter information.

The at least one second transmission parameter is a transmission parameter that is to be actually used by the user equipment at the transmission moment and is determined at least based on the transmission parameter information.

In conclusion, in the method of this embodiment, a user equipment is granted with specific independence in terms of uplink transmission parameter selection by providing a feasible uplink transmission parameter set for the user equipment, and an actual uplink transmission parameter may be determined according to factors, such as an actual available carrier resource, of the user equipment, so as to prevent some transmission resources from being wasted. In addition, according to the method of this embodiment, a base station still can have a specific control right on determination of the uplink transmission parameter, so as to help maintain stable transmission quality and control network interference within a reasonable fluctuation range.

In a possible implementation manner, the transmission parameter information may be sent by a base station at a scheduling moment by using a scheduling instruction or may be sent by using a higher level control instruction. Accordingly, step S120 may comprise:

S122: Obtain a scheduling instruction sent to the user equipment, wherein the scheduling instruction comprises the transmission parameter information.

Alternatively, step S120 may comprise:

S124: Obtain radio resource control (RRC) signaling sent to the user equipment, wherein the RRC signaling comprises the transmission parameter information.

As stated above, at least one second transmission parameter is determined at least based on the at least one first transmission parameter. In a possible implementation manner, the at least one first transmission parameter may comprise the at least one second transmission parameter, and a transmission parameter matching an actual carrier resource use status may be directly selected from the at least one first transmission parameter indicated by the base station. In this case, step S160 may comprise:

S162: Select at least one second transmission parameter, associated with the determined available carrier, of the user equipment at least according to the transmission parameter information.

In another possible implementation manner, the at least one second transmission parameter comprises a transmission parameter having a difference from the first transmission parameter. The difference may comprise a difference in a transmission parameter type or a difference in a specific transmission parameter value (the value herein comprises but not limited to a numerical value). For example, the transmission parameter information obtained in step S120 involves a transmission parameter A, a transmission parameter B, and a transmission parameter C that match a first carrier use status. Moreover, after an actual available carrier is determined in S140, the available carrier is in a second carrier use status. In this case, one or more of the foregoing transmission parameter A, transmission parameter B, and transmission parameter C that match the first carrier use status may at least be based on. That is, step S160 may comprise:

S164: Determine the at least one second transmission parameter at least according to the available carrier and the at least one first transmission parameter.

In should be noted that in such an implementation manner, in addition to determining the foregoing at least one second transmission parameter based on an actual available carrier status and the at least one first transmission parameter, other factors, such as power headroom of the user equipment, an amount of to-be-sent data, a transmission quality requirement, may also be considered comprehensively.

After the transmission parameter is determined, the method of this embodiment further comprises:

S180: Perform uplink transmission at least according to the at least one second transmission parameter.

After receiving the data transmitted by the user equipment by using the at least one second transmission parameter, the base station may indirectly obtain the at least one second transmission parameter in a blind detection manner, so as to accurately parse data of the uplink transmission. In the method of this embodiment, the base station may be explicitly notified of the at least one second transmission parameter used by the user equipment. In such an implementation manner, the method of the present embodiment may further comprise:

S182: Send information associated with the at least one second transmission parameter. For example, service data of the uplink transmission carries information associated with the at least one second transmission parameter.

In conclusion, in the method of this embodiment, flexible uplink transmission of an LAA system can be implemented, and relatively high transmission efficiency can be obtained.

Figure 2:
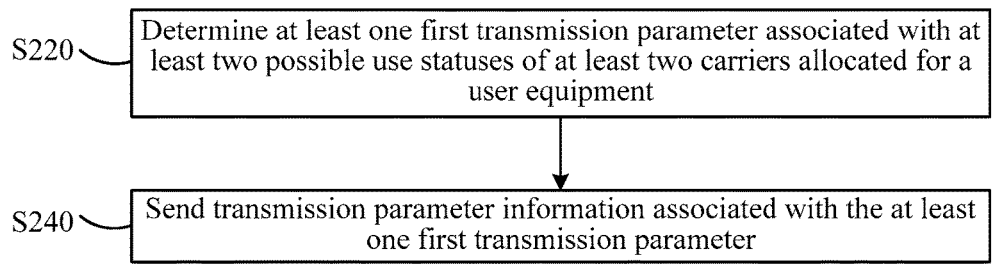
FIG. 2 is an illustrative flowchart of a transmission control method according to an embodiment of the present application.

FIG. 2 is an illustrative flowchart of a transmission control method according to an embodiment of the present application. This method is particularly applicable to a scenario where a base station schedules a user equipment on two or more than two carriers at the same time to perform uplink transmission. This method may be executed by a base station. As shown in FIG. 2, the method comprises:

S220: Determine at least one first transmission parameter associated with at least two possible use statuses of at least two carriers allocated for a user equipment, wherein the at least two carriers comprise a carrier resource in an unlicensed spectrum.

In the method of this embodiment, a base station schedules uplink transmission of a user equipment on two or more than two carriers at the same time, and the two or more than two carriers may merely comprise a carrier resource in an unlicensed spectrum or may not only comprise a carrier resource in a licensed spectrum, but also comprise a carrier resource in an unlicensed spectrum. At least one of at least two possible use statuses of the at least two carriers comprises: using at least two carriers in the at least two carriers at the same time. For example, a base station schedules a user equipment on carriers 1, 2 in an unlicensed spectrum and a carrier 3 in a licensed spectrum at the same time to perform uplink transmission, because of uncertainty of a carrier resource that belongs to the unlicensed spectrum in actual use, at a transmission moment, actual statuses of using the three carriers by the user equipment may comprise: a) all the carries 1, 2, 3 can be used at the same time, b) the carriers 1 and 2 can be used at the same time, c) the carriers 2, 3 can be used at the same time, d) the carriers 1, 3 can be used at the same time, and e) only one carrier, namely, the carrier 1 or 2 or 3 can be used. According to the method of this embodiment, at least one of at least two possible use statuses of the at least two carriers indicated by the transmission parameter information comprises any one of the foregoing a), b), c) and d) in actual use.

In the method of this embodiment, in the transmission parameter information, a first transmission parameter can be definitely specified, or an index of a first transmission parameter may be comprised, or various possible first transmission parameters may be represented in a manner of using a basic transmission parameter and an increment. For example, at least one first transmission parameter comprises a basic modulation and coding scheme, and an offset on the basis of the modulation and coding scheme is used to incrementally represent another feasible modulation and coding scheme. The transmission parameter information may also be any other information used to indicate the at least one first transmission parameter. In addition, the at least one first transmission parameter may comprise but not limited to one or more of the following: a modulation and coding scheme, uplink power of the user equipment, a size of a physical resource block used by the user equipment for sending uplink service data, or any other parameter to be used in uplink transmission. At least one first transmission parameter corresponding to each carrier resource may be determined by a base station side according to a channel status, rated transmit power of the user equipment, a distance between the user equipment and the base station, possible interference, and the like and notified to the user equipment at a scheduling moment.

S240: Send transmission parameter information associated with the at least one first transmission parameter.

In conclusion, in the method of this embodiment, a user equipment is granted with specific independence in terms of uplink transmission parameter selection by providing a feasible uplink transmission parameter set for the user equipment, which helps the user equipment to determine an actual uplink transmission parameter according to factors such as an actual available carrier resource, so as to further prevent some transmission resources from being wasted. In addition, a base station still can have a specific control right on determination of the uplink transmission parameter, so as to help maintain stable transmission quality and control network interference within a reasonable fluctuation range.

In a possible implementation manner, the transmission parameter information may be sent by a base station at a scheduling moment by using a scheduling instruction or may be sent by using a higher level control instruction. Accordingly, step S240 may comprise:

S242: Send a scheduling instruction to the user equipment, wherein the scheduling instruction comprises the transmission parameter information.

Alternatively, step S240 may comprise:

S244: Send radio resource control (RRC) signaling to the user equipment, wherein the RRC signaling comprises the transmission parameter information.

As described in FIG. 1, after receiving the data transmitted by the user equipment by using the at least one second transmission parameter, a base station side may indirectly obtain the at least one second transmission parameter actually used by the user equipment in the uplink transmission in a blind detection manner, so as to accurately parse data of the uplink transmission. The user equipment may also explicitly notify the base station of the at least one second transmission parameter used by the user equipment. In this case, the method of this embodiment may further comprise:

S260: Obtain information associated with at least one second transmission parameter.

The second transmission parameter is a transmission parameter that is determined by the user equipment at least according to the transmission parameter information and that is associated with an available carrier in the at least two carriers allocated.

It should be understood by a person skilled in the art that in the foregoing method of specific embodiments of the present application, the value of the serial number of each step does not mean an execution sequence, and the execution sequence of each step should be determined according to the function and internal logic thereof, and should not be any limitation on the implementation procedure of the specific embodiments of the present application.

In addition, an embodiment of the present application further provides a computer-readable medium, comprising a computer-readable instruction for performing the following operation when being executed: performing an operation of each step in the method of the embodiment shown in FIG. 1.

In addition, an embodiment of the present application further provides a computer-readable medium, comprising a computer-readable instruction for performing the following operation when being executed: performing an operation of each step in the method of the embodiment shown in FIG. 2.

Figure 3A:
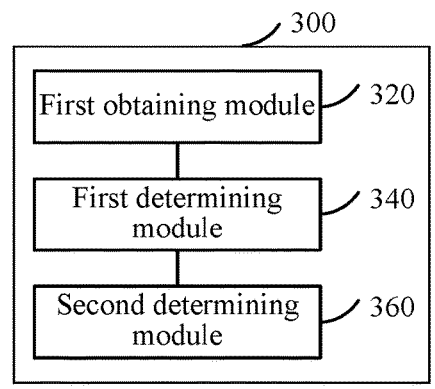
FIG. 3(*a*) and FIG. 3(*b*) are illustrative structural block diagrams of a transmission parameter determining apparatus according to an embodiment of the present application.
Figure 3B:
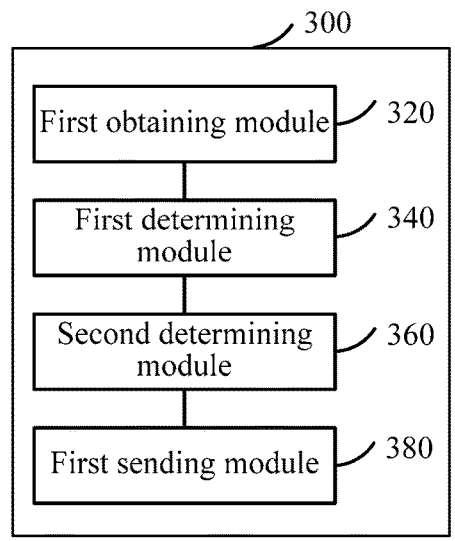

FIG. 3(*a*) is an illustrative structural block diagram of a transmission parameter determining apparatus according to an embodiment of the present application. This apparatus is particularly applicable to a scenario where a base station schedules a user equipment on two or more than two carriers at the same time to perform uplink transmission and determines a transmission parameter actually used by the user equipment when the user equipment performs uplink transmission at a transmission moment. This apparatus may be or belong to a user equipment (UE). As shown in FIG. 3(a), the apparatus 300 comprises:

a first obtaining module 320, configured to obtain transmission parameter information associated with at least two carriers allocated for a user equipment, wherein the at least two carriers comprise a carrier resource in an unlicensed spectrum, and the transmission parameter information is used to indicate at least one first transmission parameter separately associated with at least two possible use statuses of the at least two carriers.

In the apparatus of this embodiment, a base station schedules uplink transmission of a user equipment on two or more than two carriers at the same time, and the two or more than two carriers may merely comprise a carrier resource in an unlicensed spectrum or may not only comprise a carrier resource in a licensed spectrum, but also comprise a carrier resource in an unlicensed spectrum. At least one of at least two possible use statuses of the at least two carriers comprises: using at least two carriers in the at least two carriers at the same time. For example, a base station schedules a user equipment on carriers 1, 2 in an unlicensed spectrum and a carrier 3 in a licensed spectrum at the same time to perform uplink transmission, because of uncertainty of a carrier resource that belongs to the unlicensed spectrum in actual use, at a transmission moment, actual statuses of using the three carriers by the user equipment may comprise: a) all the carries 1, 2, 3 can be used at the same time, b) the carriers 1 and 2 can be used at the same time, c) the carriers 2, 3 can be used at the same time, d) the carriers 1, 3 can be used at the same time, and e) only one carrier, namely, the carrier 1 or 2 or 3 can be used. According to the apparatus of this embodiment, at least one of at least two possible use statuses of the at least two carriers indicated by the transmission parameter information comprises any one of the foregoing a), b), c) and d) in actual use. In other words, the transmission parameter information in the apparatus of this embodiment is used to indicate: with regard to the at least two carriers allocated by the base station, a feasible set of at least one first transmission parameter in at least two possible use statuses comprising using multiple carriers at the same time.

In the apparatus of this embodiment, in the transmission parameter information, a first transmission parameter can be definitely specified, or an index of a first transmission parameter may be comprised, or various possible first transmission parameters may be represented in a manner of using a basic transmission parameter and an increment. For example, at least one first transmission parameter comprises a basic modulation and coding scheme, and an offset on the basis of the modulation and coding scheme is used to incrementally represent another feasible modulation and coding scheme. The transmission parameter information may also be any other information used to indicate the at least one first transmission parameter. In addition, the at least one first transmission parameter may comprise but not limited to one or more of the following: a modulation and coding scheme, uplink power of the user equipment, a size of a physical resource block used by the user equipment for sending uplink service data, or any other parameter to be used in uplink transmission. At least one first transmission parameter corresponding to each carrier resource may be determined by a base station side according to a channel status, rated transmit power of the user equipment, a distance between the user equipment and the base station, possible interference, and the like and notified to the user equipment at a scheduling moment. The first obtaining module 320 may obtain the at least one transmission parameter in a manner of communicating with the base station or the user equipment.

A first determining module 340 is configured to determine an available carrier of the user equipment in the at least two carriers.

In a possible implementation manner, the available carrier may be determined by the user equipment in a contention manner.

A second determining module 360 is configured to determine at least one second transmission parameter, associated with the determined available carrier, of the user equipment at least according to the transmission parameter information.

The at least one second transmission parameter is a transmission parameter that is to be actually used by the user equipment at the transmission moment and is determined at least based on the transmission parameter information.

In conclusion, in the apparatus of this embodiment, a user equipment is granted with specific independence in terms of uplink transmission parameter selection by providing a feasible uplink transmission parameter set for the user equipment, and an actual uplink transmission parameter may be determined according to factors, such as an actual available carrier resource, of the user equipment, so as to prevent some transmission resources from being wasted. In addition, even if the apparatus of this embodiment is used, a base station still can have a specific control right on determination of the uplink transmission parameter, so as to help maintain stable transmission quality and control network interference within a reasonable fluctuation range.

In a possible implementation manner, the transmission parameter information may be sent by a base station at a scheduling moment by using a scheduling instruction or may be sent by using a higher level control instruction. Accordingly, the first obtaining module 320 may be configured to obtain a scheduling instruction sent to the user equipment, wherein the scheduling instruction comprises the transmission parameter information; or configured to obtain radio resource control (RRC) signaling sent to the user equipment, wherein the RRC signaling comprises the transmission parameter information.

As stated above, at least one second transmission parameter is determined at least based on the at least one first transmission parameter. In a possible implementation manner, the at least one first transmission parameter may comprise the at least one second transmission parameter, and a transmission parameter matching an actual carrier resource use status may be directly selected from the at least one first transmission parameter indicated by the base station. In this case, the second determining module 360 may be configured to select at least one second transmission parameter, associated with the determined available carrier, of the user equipment at least according to the transmission parameter information.

In another possible implementation manner, the at least one second transmission parameter comprises a transmission parameter having a difference from the first transmission parameter. The difference may comprise a difference in a transmission parameter type or a difference in a specific transmission parameter value (the value herein comprises but not limited to a numerical value). For example, the transmission parameter information obtained by the first obtaining module 320 involves a transmission parameter A, a transmission parameter B, and a transmission parameter C that match a first carrier use status. Moreover, after an actual available carrier is determined by the first determining module 340, the available carrier is in a second carrier use status. In this case, one or more of the foregoing transmission parameter A, transmission parameter B, and transmission parameter C that match the first carrier use status may at least be based on. That is, the second determining module 360 may be configured to determine the at least one second transmission parameter at least according to the available carrier and the at least one first transmission parameter.

In should be noted that in such an implementation manner, in addition to determining the foregoing at least one second transmission parameter based on an actual available carrier status and the at least one first transmission parameter, other factors, such as power headroom of the user equipment, an amount of to-be-sent data, a transmission quality requirement, may also be considered comprehensively.

As shown in FIG. 3(*b*), the apparatus 300 of the present embodiment may further comprise:

a first sending module 380, configured to perform uplink transmission at least according to the at least one second transmission parameter.

After receiving the data transmitted by the user equipment by using the at least one second transmission parameter, the base station may indirectly obtain the at least one second transmission parameter in a blind detection manner, so as to accurately parse data of the uplink transmission. The apparatus of this embodiment may also explicitly notify the base station of the at least one second transmission parameter used by the user equipment. In such an implementation manner, the first sending module 380 is further configured to send information associated with the at least one second transmission parameter. For example, service data of the uplink transmission carries information associated with the at least one second transmission parameter.

In conclusion, the apparatus of this embodiment can implement flexible uplink transmission of an LAA system and can obtain relatively high transmission efficiency.

Figure 4A:
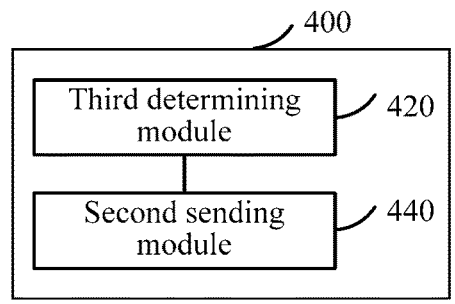
FIG. 4(*a*) and FIG. 4(*b*) are illustrative structural block diagrams of a transmission control apparatus according to an embodiment of the present application.

FIG. 4(*a*) is an illustrative structural block diagram of a transmission control apparatus according to an embodiment of the present application. This apparatus is particularly applicable to a scenario where a base station schedules a user equipment on two or more than two carriers at the same time to perform uplink transmission. This apparatus may be or belong to a base station. As shown in FIG. 4(*a*), the apparatus 400 comprises:

a third determining module 420, configured to determine at least one first transmission parameter associated with at least two possible use statuses of at least two carriers allocated for a user equipment, wherein the at least two carriers comprise a carrier resource in an unlicensed spectrum.

In the apparatus of this embodiment, a base station schedules uplink transmission of a user equipment on two or more than two carriers at the same time, and the two or more than two carriers may merely comprise a carrier resource in an unlicensed spectrum or may not only comprise a carrier resource in a licensed spectrum, but also comprise a carrier resource in an unlicensed spectrum. At least one of at least two possible use statuses of the at least two carriers comprises: using at least two carriers in the at least two carriers at the same time. For example, a base station schedules a user equipment on carriers 1, 2 in an unlicensed spectrum and a carrier 3 in a licensed spectrum at the same time to perform uplink transmission, because of uncertainty of a carrier resource that belongs to the unlicensed spectrum in actual use, at a transmission moment, actual statuses of using the three carriers by the user equipment may comprise:

a) all the carries 1, 2, 3 can be used at the same time, b) the carriers 1 and 2 can be used at the same time, c) the carriers 2, 3 can be used at the same time, d) the carriers 1, 3 can be used at the same time, and e) only one carrier, namely, the carrier 1 or 2 or 3 can be used. In the apparatus of this embodiment, at least one of at least two possible use statuses of the at least two carriers indicated by the transmission parameter information comprises any one of the foregoing a), b), c) and d) in actual use.

In the apparatus of this embodiment, in the transmission parameter information, a first transmission parameter can be definitely specified, or an index of a first transmission parameter may be comprised, or various possible first transmission parameters may be represented in a manner of using a basic transmission parameter and an increment. For example, at least one first transmission parameter comprises a basic modulation and coding scheme, and an offset on the basis of the modulation and coding scheme is used to incrementally represent another feasible modulation and coding scheme. The transmission parameter information may also be any other information used to indicate the at least one first transmission parameter. In addition, the at least one first transmission parameter may comprise but not limited to one or more of the following: a modulation and coding scheme, uplink power of the user equipment, a size of a physical resource block used by the user equipment for sending uplink service data, or any other parameter to be used in uplink transmission. At least one first transmission parameter corresponding to each carrier resource may be determined by a base station side according to a channel status, rated transmit power of the user equipment, a distance between the user equipment and the base station, possible interference, and the like and notified to the user equipment at a scheduling moment.

A second sending module 440 is configured to send transmission parameter information associated with the at least one first transmission parameter.

In conclusion, in the apparatus of this embodiment, a user equipment is granted with specific independence in terms of uplink transmission parameter selection by providing a feasible uplink transmission parameter set for the user equipment, which helps the user equipment to determine an actual uplink transmission parameter according to factors such as an actual available carrier resource, so as to further prevent some transmission resources from being wasted. In addition, even if the apparatus of this embodiment is used, a base station still can have a specific control right on determination of the uplink transmission parameter, so as to help maintain stable transmission quality and control network interference within a reasonable fluctuation range.

In a possible implementation manner, the transmission parameter information may be sent by a base station at a scheduling moment by using a scheduling instruction or may be sent by using a higher level control instruction. Accordingly, the second sending module 440 may be configured to send a scheduling instruction to the user equipment, wherein the scheduling instruction comprises the transmission parameter information; or configured to send radio resource control (RRC) signaling to the user equipment, wherein the RRC signaling comprises the transmission parameter information.

Figure 4B:
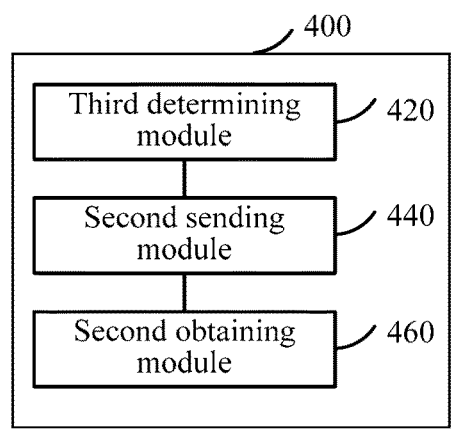

As described in FIG. 3(*b*), after receiving the data transmitted by the user equipment by using the at least one second transmission parameter, a base station side may indirectly obtain the at least one second transmission parameter actually used by the user equipment in the uplink transmission in a blind detection manner, so as to accurately parse data of the uplink transmission. The user equipment may also explicitly notify the base station of the at least one second transmission parameter used by the user equipment. In this case, as shown in FIG. 4(b), the apparatus 400 of this embodiment may further comprise:

a second obtaining module 460, configured to obtain information associated with at least one second transmission parameter.

The second transmission parameter is a transmission parameter that is determined by the user equipment at least according to the transmission parameter information and that is associated with an available carrier in the at least two carriers allocated.

The methods and apparatuses of embodiments of the present application are further described by using specific examples.

Assuming that an unlicensed spectrum used by an LAA system has four carriers, a base station indicates, at a scheduling moment, scheduling uplink transmission of a user equipment on a carrier 1 and a carrier 2 at the same time and indicates uplink transmit power when the carrier 1 and the carrier 2 are used at the same time (a half of rated transmit power of a user equipment is used on each carrier), uplink transmit power when the carrier 2 and a carrier 3 are used at the same time, and a set of all feasible modulation and coding schemes. At an uplink transmission moment, the user equipment only obtains the carrier 1 by contention. If transmission parameters that are determined in advance are completely followed, only a half of the transmit power can be used to send data on the carrier 1, which causes waste of power headroom. Actual transmission parameters are adjusted according to the methods of the embodiments of the present application: full transmit power is used on the carrier 1, and a more suitable modulation and coding scheme that can obtain a higher transmission rate is used. Because the user equipment uses higher transmit power on the carrier 1, the selected modulation and coding scheme, as compared with performing sending by using a half of transmit power, can obtain a higher transmission rate, thereby improving a utilization ratio of a carrier resource and increasing a transmission capacity of the LAA system.

Figure 5:
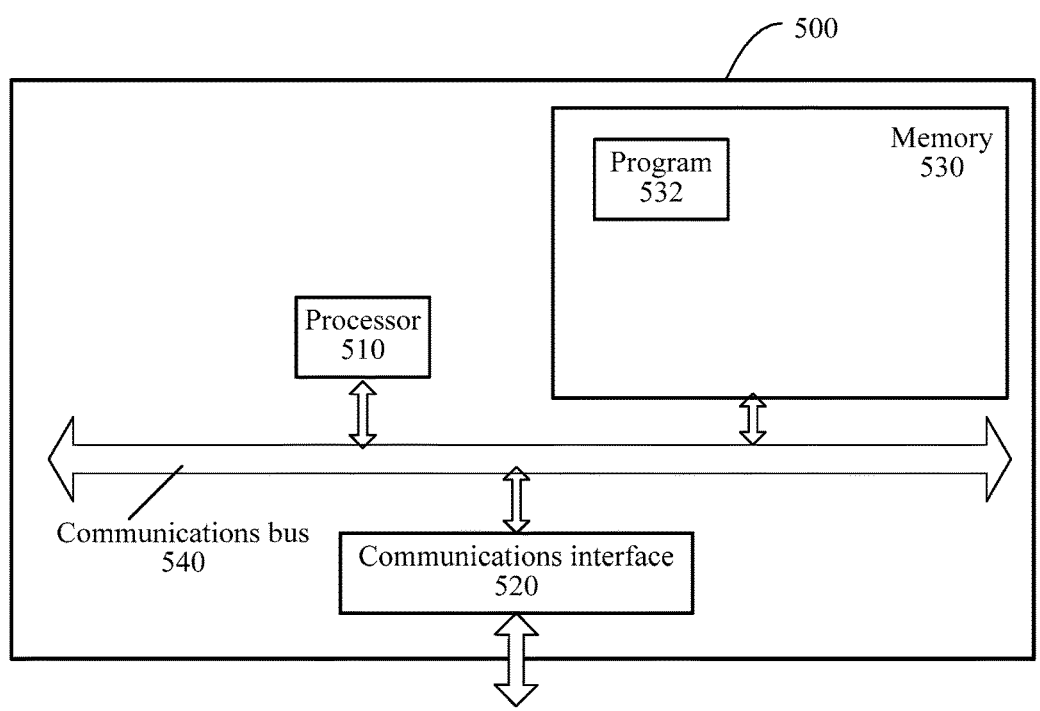
FIG. 5 is another illustrative structural block diagram of the transmission parameter determining apparatus according to an embodiment of the present application.

FIG. 5 is another illustrative schematic structural diagram of a transmission parameter determining apparatus according to an embodiment of the present application. The specific embodiments of the present application are not intended to limit the specific implementation of the transmission parameter determining apparatus. As shown in FIG. 5, the transmission parameter determining apparatus 500 may comprise:

a processor 510, a communications interface 520, a memory 530, and a communications bus 540.

The processor 510, the communications interface 520, and the memory 530 communicate with each other by using the communications bus 540.

The communications interface 520 is configured to communicate with a network element such as a client.

The processor 510 is configured to execute a program 532 and specifically, can perform relevant steps in the foregoing method embodiment of FIG. 1.

Specifically, the program 532 may comprise program code, wherein the program code comprises a computer operation instruction.

The processor 510 may be a central processing unit (CPU), an application specific integrated circuit (ASIC), or one or more integrated circuits configured to implement the embodiments of the present application.

The memory 530 is configured to store the program 532. The memory 530 may comprise a high-speed RAM memory or may further comprise a non-volatile memory, for example, at least one magnetic disk memory. The program 532 may specifically be used for enabling the transmission parameter determining apparatus 500 to perform the following steps:

obtaining transmission parameter information associated with at least two carriers allocated for a user equipment, wherein the at least two carriers comprise a carrier resource in an unlicensed spectrum, and the transmission parameter information is used to indicate at least one first transmission parameter separately associated with at least two possible use statuses of the at least two carriers;

determining an available carrier of the user equipment in the at least two carriers; and determining at least one second transmission parameter, associated with the determined available carrier, of the user equipment at least according to the transmission parameter information.

For the specific implementation of the steps in the program 532, refer to the corresponding descriptions of corresponding steps and units in the foregoing embodiments, which are not described herein again. It may be clearly understood by a person skilled in the art that, for the purpose of convenient and brief description, reference may be made to the description of corresponding procedures in the foregoing method embodiments for detailed working procedures of the foregoing devices and modules, and details are not described herein again.

It may be clearly understood by a person skilled in the art that, for the purpose of convenient and brief description, reference may be made to the description of corresponding procedures in the foregoing method embodiments for detailed working procedures of the foregoing devices and modules, and details are not described herein again.

Figure 6:
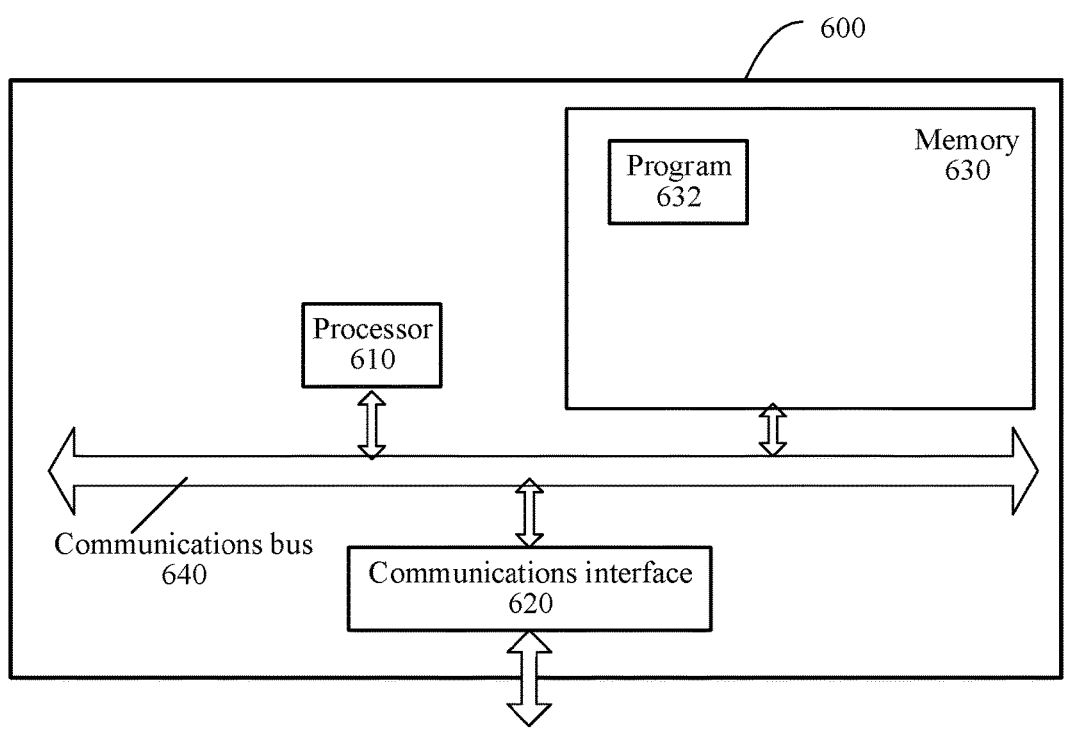
FIG. 6 is another illustrative structural block diagram of the transmission control apparatus according to an embodiment of the present application.

FIG. 6 is another illustrative schematic structural diagram of a transmission control apparatus according to an embodiment of the present application. The specific embodiments of the present application are not intended to limit the specific implementation of the transmission control apparatus. As shown in FIG. 6, the transmission control apparatus 600 may comprise:

a processor 610, a communications interface 620, a memory 630, and a communications bus 640.

The processor 610, the communications interface 620, and the memory 630 communicate with each other by using the communications bus 640.

The communications interface 620 is configured to communicate with a network element such as a client.

The processor 610 is configured to execute a program 632 and specifically, can perform relevant steps in the foregoing method embodiment of FIG. 2.

Specifically, the program 632 may comprise program code, wherein the program code comprises a computer operation instruction.

The processor 610 may be a central processing unit (CPU), an application specific integrated circuit (ASIC), or one or more integrated circuits configured to implement the embodiments of the present application.

The memory 630 is configured to store the program 632. The memory 630 may comprise a high-speed RAM memory or may further comprise a non-volatile memory, for example, at least one magnetic disk memory. The program 632 may specifically be used for enabling the transmission control apparatus 600 to perform the following steps:

determining at least one first transmission parameter associated with at least two possible use statuses of at least two carriers allocated for a user equipment, wherein the at least two carriers comprise a carrier resource in an unlicensed spectrum; and sending transmission parameter information associated with the at least one first transmission parameter.

For the specific implementation of the steps in the program 632, refer to the corresponding descriptions of corresponding steps and units in the foregoing embodiments, which are not described herein again. It may be clearly understood by a person skilled in the art that, for the purpose of convenient and brief description, reference may be made to the description of corresponding procedures in the foregoing method embodiments for detailed working procedures of the foregoing devices and modules, and details are not described herein again.

It may be clearly understood by a person skilled in the art that, for the purpose of convenient and brief description, reference may be made to the description of corresponding procedures in the foregoing method embodiments for detailed working procedures of the foregoing devices and modules, and details are not described herein again.

Although the subject matter is described herein in the general context of program modules that execute in conjunction with an application program that runs on an operating system on a computer system, a person skilled in the art will recognize that the subject matter may also be implemented in combination with other types of program modules. Generally, program modules comprise routines, programs, components, data structures and other types of structures that perform particular tasks or implement particular abstract data types. It can be understood by a person skilled in the art that the invention described herein may be practiced with other computer system configurations, comprising handheld devices, multiprocessor systems, microprocessor-based or programmable consumer electronics, minicomputers, mainframe computers, and so on, and may also be practiced in distributed computing environments wherein tasks are performed by remote processing devices linked through a communications network. In a distributed computing environment, program modules may be located in both local and remote memory storage devices.

A person of ordinary skill in the art may be aware that, in combination with the examples described in the embodiments disclosed in this specification, units and method steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

When the functions are implemented in a form of a software functional unit and sold or used as an independent product, the functions may be stored in a computer-readable storage medium. Based on such an understanding, the technical solutions of the present application essentially, or the part contributing to the existing art, or all or a part of the technical solutions may be implemented in the form of a software product. The software product is stored in a storage medium and comprises several instructions for instructing a computer device (which may be a personal computer, a server, or a network device) or a processor to perform all or a part of the steps of the methods in the embodiments of the present application. The foregoing computer-readable storage medium comprises physical volatile and non-volatile, removable and non-removable mediums that are implemented in any method or technology for storage of information such as computer-readable instructions, data structures, program modules or other data. The computer-readable storage medium specifically comprises, but is not limited to, a USB flash drive, a removable hard disk, a read-only memory (ROM), a random access memory (RAM), an erasable programmable read-only memory (EPROM), an electrically erasable programmable read-only memory (EEPROM), a flash memory or other solid-state memory technology, a CD-ROM, a digital versatile disc (DVD), an HD-DVD, a Blue-ray disc or other optical storage devices, a magnetic tape, magnetic disk storage or other magnetic storage devices, or any other medium that can be used for storing required information and can be accessed by a computer.

The above implementations are only used to describe the present invention, rather than limit the present invention; various alterations and variants can be made by those of ordinary skill in the art without departing from the spirit and scope of the present invention, so all equivalent technical solutions also belong to the scope of the present invention, and the scope of patent protection of the present invention should be defined by claims.

What is claimed is:

1. A transmission parameter determining method, applied in a user equipment, wherein the method comprises:

obtaining transmission parameter information associated with at least two carriers allocated for the user equipment, wherein the at least two carriers comprise a carrier resource in an unlicensed spectrum, and the transmission parameter information is used to indicate at least one first transmission parameter separately associated with at least two use statuses of the at least two carriers;

determining an available carrier of the user equipment in the at least two carriers;

determining at least one second transmission parameter, associated with the determined available carrier, of the user equipment at least according to the transmission parameter information; and performing uplink transmission at least according to the at least one second transmission parameter.

2. The method of claim 1, wherein at least one of the at least two use statuses of the at least two carriers comprises: using at least two carriers in the at least two carriers at the same time.

3. The method of claim 1, wherein the obtaining transmission parameter information associated with at least two carriers allocated for a user equipment comprises:

obtaining a scheduling instruction sent to the user equipment, wherein the scheduling instruction comprises the transmission parameter information.

4. The method of claim 1, wherein the obtaining transmission parameter information associated with at least two carriers allocated for a user equipment comprises:

obtaining radio resource control (RRC) signaling sent to the user equipment, wherein the RRC signaling comprises the transmission parameter information.

5. The method of claim 1, wherein the transmission parameter information comprises: the at least one first transmission parameter or an index of the at least one first transmission parameter.

6. The method of claim 5, wherein the at least one first transmission parameter comprises the at least one second transmission parameter; and the determining at least one second transmission parameter, associated with the determined available carrier, of the user equipment comprises:

selecting at least one second transmission parameter, associated with the determined available carrier, of the user equipment at least according to the transmission parameter information.

7. The method of claim 5, wherein the at least one second transmission parameter comprises a transmission parameter having a difference from the first transmission parameter; and the determining at least one second transmission parameter, associated with the determined available carrier, of the user equipment comprises:

determining the at least one second transmission parameter at least according to the available carrier and the at least one first transmission parameter.

8. The method of claim 7, wherein the difference comprises a difference in a transmission parameter type and/or a difference in a transmission parameter value.

9. The method of claim 1, wherein the method further comprises:

sending information associated with the at least one second transmission parameter.

10. The method of claim 1, wherein the at least one first transmission parameter comprises at least one of the following: uplink transmit power, a modulation and coding scheme, and a data block size.

11. The method of claim 1, wherein the at least one second transmission parameter comprises at least one of the following: uplink transmit power, a modulation and coding scheme, and a data block size.

12. The method of claim 1, wherein the determining an available carrier of the user equipment in the at least two carriers comprises:

determining the available carrier in a contention manner.

13. A transmission control method, applied in a base station, wherein the method comprises:

determining at least one first transmission parameter associated with at least two use statuses of at least two carriers allocated for a user equipment, wherein the at least two carriers comprise a carrier resource in an unlicensed spectrum;

sending transmission parameter information associated with the at least one first transmission parameter to the user equipment; and receiving data transmitted by the user equipment at least according to at least one second transmission parameter that is associated with an available carrier of the user equipment in the at least two carriers, wherein the second transmission parameter is determined by the user equipment at least according to the transmission parameter information.

14. The method of claim 13, wherein the at least two use statuses of the at least two carriers comprise: using at least two carriers in the at least two carriers at the same time.

15. The method of claim 14, wherein the sending transmission parameter information associated with the at least one first transmission parameter comprises: sending a scheduling instruction to the user equipment, wherein the scheduling instruction comprises the transmission parameter information.

16. The method of claim 14, wherein the sending transmission parameter information associated with the at least one first transmission parameter comprises:

sending radio resource control (RRC) signaling to the user equipment, wherein the RRC signaling comprises the transmission parameter information.

17. The method of claim 14, wherein the transmission parameter information comprises: the at least one first transmission parameter or an index of the at least one first transmission parameter.

18. The method of claim 14, wherein the method further comprises:

obtaining information associated with at least one second transmission parameter, wherein:

the second transmission parameter is a transmission parameter that is determined by the user equipment at least according to the transmission parameter information and that is associated with an available carrier in the at least two carriers allocated.

19. The method of claim 13, wherein the at least one first transmission parameter comprises at least one of the following: uplink transmit power, a modulation and coding scheme, and a data block size.

20. The method of claim 13, wherein the at least one second transmission parameter comprises at least one of the following: uplink transmit power, a modulation and coding scheme, and a data block size.

21. A transmission parameter determining apparatus, in a user equipment, wherein the apparatus comprises:

a first obtaining module, configured to obtain transmission parameter information associated with at least two carriers allocated for the user equipment, wherein the at least two carriers comprise a carrier resource in an unlicensed spectrum, and the transmission parameter information is used to indicate at least one first transmission parameter separately associated with at least two use statuses of the at least two carriers;

a first determining module, configured to determine an available carrier of the user equipment in the at least two carriers;

a second determining module, configured to determine at least one second transmission parameter, associated with the determined available carrier, of the user equipment at least according to the transmission parameter information; and a first sending module, configured to perform uplink transmission at least according to the at least one second transmission parameter.

22. The apparatus of claim 21, wherein the first obtaining module is configured to obtain a scheduling instruction sent to the user equipment, wherein the scheduling instruction comprises the transmission parameter information.

23. The apparatus of claim 21, wherein the first obtaining module is configured to obtain radio resource control (RRC) signaling sent to the user equipment, wherein the RRC signaling comprises the transmission parameter information.

24. The apparatus of claim 21, wherein the at least one first transmission parameter comprises the at least one second transmission parameter; and the second determining module is configured to select at least one second transmission parameter, associated with the determined available carrier, of the user equipment at least according to the transmission parameter information.

25. The apparatus of claim 21, wherein the at least one second transmission parameter comprises a transmission parameter having a difference from the first transmission parameter; and
the second determining module is configured to determine the at least one second transmission parameter at least according to the available carrier and the at least one first transmission parameter.

26. The apparatus of claim 21, wherein the first sending module is further configured to send information associated with the at least one second transmission parameter.

27. The apparatus of claim 21, wherein the first determining module is configured to determine the available carrier in a contention manner.

28. A transmission control apparatus, in a base station, wherein the apparatus comprises:
a third determining module, configured to determine at least one first transmission parameter associated with at least two use statuses of at least two carriers allocated for a user equipment, wherein the at least two carriers comprise a carrier resource in an unlicensed spectrum; and
a second sending module, configured to send transmission parameter information associated with the at least one first transmission parameter to the user equipment; and
a receiving module, configured to receive data transmitted by the user equipment at least according to at least one second transmission parameter that is associated with an available carrier of the user equipment in the at least two carriers, wherein the second transmission parameter is determined by the user equipment at least according to the transmission parameter information.

29. The apparatus of claim 28, wherein the second sending module is configured to send a scheduling instruction to the user equipment, wherein the scheduling instruction comprises the transmission parameter information.

30. The apparatus of claim 28, wherein the second sending module is configured to send radio resource control (RRC) signaling to the user equipment, wherein the RRC signaling comprises the transmission parameter information.

31. The apparatus of claim 28, wherein the apparatus further comprises:
a second obtaining module, configured to obtain information associated with at least one second transmission parameter, wherein
the second transmission parameter is a transmission parameter that is determined by the user equipment at least according to the transmission parameter information and that is associated with an available carrier in the at least two carriers allocated.

32. A transmission apparatus, in a user equipment, wherein the apparatus comprises:
a transceiver;
a memory, configured to store an instruction; and
a processor, configured to execute the instruction stored by the memory, wherein the instruction enables the processor to perform the following steps:
obtaining transmission parameter information associated with at least two carriers allocated for the user equipment, wherein the at least two carriers comprise a carrier resource in an unlicensed spectrum, and the transmission parameter information is used to indicate at least one first transmission parameter separately associated with at least two use statuses of the at least two carriers;
determining an available carrier of the user equipment in the at least two carriers;
determining at least one second transmission parameter, associated with the determined available carrier, of the user equipment at least according to the transmission parameter information; and
performing uplink transmission at least according to the at least one second transmission parameter by using the transceiver.

33. A transmission control apparatus, in a base station, wherein the apparatus comprises:
a transceiver;
a memory, configured to store an instruction; and
a processor, configured to execute the instruction stored by the memory, wherein the instruction enables the processor to perform the following steps:
obtaining a scheduling instruction by using the transceiver, wherein the scheduling instruction is used to instruct a user equipment to perform transmission preparation;
determining at least one first transmission parameter associated with at least two use statuses of at least two carriers allocated for the user equipment, wherein the at least two carriers comprise a carrier resource in an unlicensed spectrum;
sending transmission parameter information associated with the at least one first transmission parameter by using the transceiver to the user equipment; and
receiving data transmitted by the user equipment at least according to at least one second transmission parameter that is associated with an available carrier of the user equipment in the at least two carriers, wherein the second transmission parameter is determined by the user equipment at least according to the transmission parameter information.

* * * * *